United States Patent
Yoshida

(10) Patent No.: US 10,371,239 B2
(45) Date of Patent: Aug. 6, 2019

(54) POWER STEERING DEVICE

(71) Applicant: HITACHI AUTOMOTIVE SYSTEMS, LTD., Hitachinaka-shi, Ibaraki (JP)

(72) Inventor: Osamu Yoshida, Yokohama (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/543,772

(22) PCT Filed: Nov. 27, 2015

(86) PCT No.: PCT/JP2015/083388
§ 371 (c)(1),
(2) Date: Jul. 14, 2017

(87) PCT Pub. No.: WO2016/114021
PCT Pub. Date: Jul. 21, 2016

(65) Prior Publication Data
US 2018/0003275 A1 Jan. 4, 2018

(30) Foreign Application Priority Data

Jan. 16, 2015 (JP) .................................. 2015-006381

(51) Int. Cl.
*F16H 25/22* (2006.01)
*B62D 5/04* (2006.01)

(52) U.S. Cl.
CPC ........... *F16H 25/2223* (2013.01); *B62D 5/04* (2013.01); *B62D 5/0424* (2013.01); *B62D 5/0448* (2013.01); *F16H 25/2214* (2013.01)

(58) Field of Classification Search
CPC ...... F16H 25/2223; F16H 25/22; F16H 25/24; F16H 35/18; B62D 5/04; B62D 5/0424; B62D 5/0448

(Continued)

(56) References Cited

U.S. PATENT DOCUMENTS 6,244,125 B1 * 6/2001 Sano .................... B62D 5/0445
   180/443
6,282,972 B2 * 9/2001 Kuramochi ......... F16H 25/2214
   74/459.5

(Continued)

FOREIGN PATENT DOCUMENTS

JP   S57-38829 B2   8/1982
JP   H06-69502 U   9/1994

(Continued)

OTHER PUBLICATIONS

U.S. Appl. No. 15/542,312, filed Jul. 7, 2017, Kitamura et al.

(Continued)

*Primary Examiner* — Jacob D Knutson
(74) *Attorney, Agent, or Firm* — Foley & Lardner LLP

(57) ABSTRACT

A power steering device includes: first and second load transition regions provided in first and second predetermined ranges in a nut side ball screw groove from the other end side openings of the first and second connection passages along the nut ball screw groove, formed so that radial distances between a rotation axis of the nut and the nut side ball screw groove are gradually increased toward the other end side opening of the first and second connection passages, and formed so that the balls pass through first and second no load regions, and then pass through a first load region, when the balls in the first and second predetermined ranges are moved from the other end side opening of the first and second connection passages along the nut side ball screw groove.

18 Claims, 10 Drawing Sheets

(58) Field of Classification Search
USPC .......................................................... 180/444
See application file for complete search history.

(56) References Cited

U.S. PATENT DOCUMENTS

| | | | |
|---|---|---|---|
| 6,450,055 B1* | 9/2002 | Sekiya | F16H 25/2214 74/424.87 |
| 6,978,693 B2* | 12/2005 | Ohkubo | F16H 25/2214 74/424.75 |
| 9,314,835 B2* | 4/2016 | Kitamura | B21K 1/64 |
| 9,346,485 B2 | 5/2016 | Muto et al. | |
| 9,568,078 B2 | 2/2017 | Suzuki | |
| 2002/0023513 A1 | 2/2002 | Sekiya et al. | |
| 2007/0006676 A1 | 1/2007 | Mizuhara et al. | |
| 2009/0260468 A1* | 10/2009 | Tachikake | B62D 3/02 74/424.82 |
| 2014/0284133 A1* | 9/2014 | Muto | B62D 5/0448 180/444 |
| 2014/0284134 A1* | 9/2014 | Kitamura | B62D 5/0448 180/444 |
| 2016/0207560 A1* | 7/2016 | Muto | B62D 5/0403 |
| 2017/0174253 A1* | 6/2017 | Kitamura | B62D 5/0448 |
| 2018/0149245 A1 | 5/2018 | Yamashita et al. | |

FOREIGN PATENT DOCUMENTS

| | | |
|---|---|---|
| JP | 2001-141019 A | 5/2001 |
| JP | 2003-172422 A | 6/2003 |
| JP | 2004-353835 A | 12/2004 |
| JP | 2005-076652 A | 3/2005 |
| JP | 2005-249046 A | 9/2005 |
| JP | 2013-024318 A | 2/2013 |
| JP | 2014-185724 A | 10/2014 |
| WO | WO-2014/192595 A1 | 12/2014 |
| WO | WO-2016/114021 A1 | 7/2016 |

OTHER PUBLICATIONS

International Search Report and Written Opinion issued in parent application PCT/JP2015/083389, dated Feb. 16, 2016, 9 pages.
International Search Report and Written Opinion issued in parent Application PCT/JP2015/083388, dated Jan. 26, 2016, 11 pages.
Kitamura: Notice of Allowance in U.S. Appl. No. 15/542,312 dated Jan. 23, 2019.

\* cited by examiner (a)　　　　　　　　(b)

POWER STEERING DEVICE

TECHNICAL FIELD

This invention relates to a power steering device of a rack assist type which is applied to, for example, a vehicle, and which is arranged to assist a movement of a rack shaft by a rotation force of a motor that is transmitted through a ball screw.

BACKGROUND ART

There is known a conventional power steering device of a rack assist type such as a below-described patent document 1.

That is, in this ball screw, a plurality balls which are rolling members are circulated through a tube between a pair of ball screw grooves formed on inner and outer circumference portions of a screw shaft and the nut to confront each other. A connection portion between a ball inlet and outlet holes provided in the nut and the ball screw groove (nut side ball screw groove) is processed into a diameter increasing tapered shape. With this, a smooth movement of the balls between the tube and the ball screw groove is ensured.

PRIOR ART DOCUMENT

Patent Document

Patent Document 1: Japanese Patent Application Publication No. 2001-141019

SUMMARY OF THE INVENTION

Problems which the Invention is Intended to Solve

However, in the conventional ball screw, the movement of the balls are smoothed by the diameter increasing taper processed portion. However, when passing through the diameter increasing taper processed portion, the balls do not receive (are not subjected to) the load. The balls receive (are subjected to) the sufficient load immediately after passing through the tapered processed portion. That is, it is suddenly shifted from the no load state in the diameter increasing taper processed portion to the load state after passing through the diameter increasing taper processed portion. Accordingly, a torque variation becomes large due to this sudden load variation. With this, a steering feeling is deteriorated.

It is, therefore, an object of the present invention to provide a power steering device devised to solve the above mentioned problems, and to improve a steering feeling by suppressing a load variation to a ball.

Means for Solving the Problem

Specifically, in the present invention, there are provided a first load transition region provided in a first predetermined range in the nut side ball screw groove from the other end side opening of the first connection passage along the nut ball screw groove, formed so that a radial distance between a rotation axis of the nut and the nut side ball screw groove is gradually increased toward the other end side opening of the first connection passage, and formed so that the balls pass through a first no load region in which a load is not transmitted from the nut side to the steered shaft side, and then the balls pass through a first load region in which the load is transmitted from the nut side to the steered shaft side, when the balls in the first predetermined range are moved from the other end side opening of the first connection passage along the nut side ball screw groove; and a second load transition region provided in a second predetermined range in the nut side ball screw groove from the other end side opening of the second connection passage along the nut side ball screw groove, formed so that a radial distance between the rotation axis of the nut and the nut side ball screw groove is gradually increased toward the other end side opening of the second connection passage, and formed so that the balls pass through a second no load region in which the load is not transmitted from the nut side to the steered shaft side, and then the balls pass through a second load region in which the load is transmitted from the nut side to the steered shaft side, when the balls in the second predetermined range are moved from the other end side opening of the second connection passage along the nut side ball screw groove.

Benefit of the Invention

In the present invention, there are provided the first and second load transition regions. The load acted to the ball is gradually increased on the inlet side, and gradually decreased on the outlet side. Accordingly, it is possible to smooth the transmission of the force of the ball moved between the no load region and the load region. With this, it is possible to suppress the torque variation at the actuation of the ball screw mechanism, to suppress the catching (hooking) feeling of the ball screw mechanism due to the torque variation, and thereby to improve the steering feeling.

In particular, in the present invention, there are switching points between the no load region and the load region in the first and second load transition regions. Accordingly, it is possible to suppress the sudden variation.

BRIEF DESCRIPTION OF DRAWINGS

FIG. 7(a) is a sectional view taken along a D-D line of FIG. 5. FIG. 7(b) is a sectional view taken along an E-E line of FIG. 5.

FIG. 11(a) is a graph in a conventional ball screw. FIG. 11(b) is a graph in the ball screw according to the present invention.

DESCRIPTION OF EMBODIMENTS

Hereinafter, a power steering device according to one embodiment of the present invention is explained with reference to the drawings. Besides, in the below-described embodiment, the power steering device is applied to a steering device of a vehicle.

Figure 1:
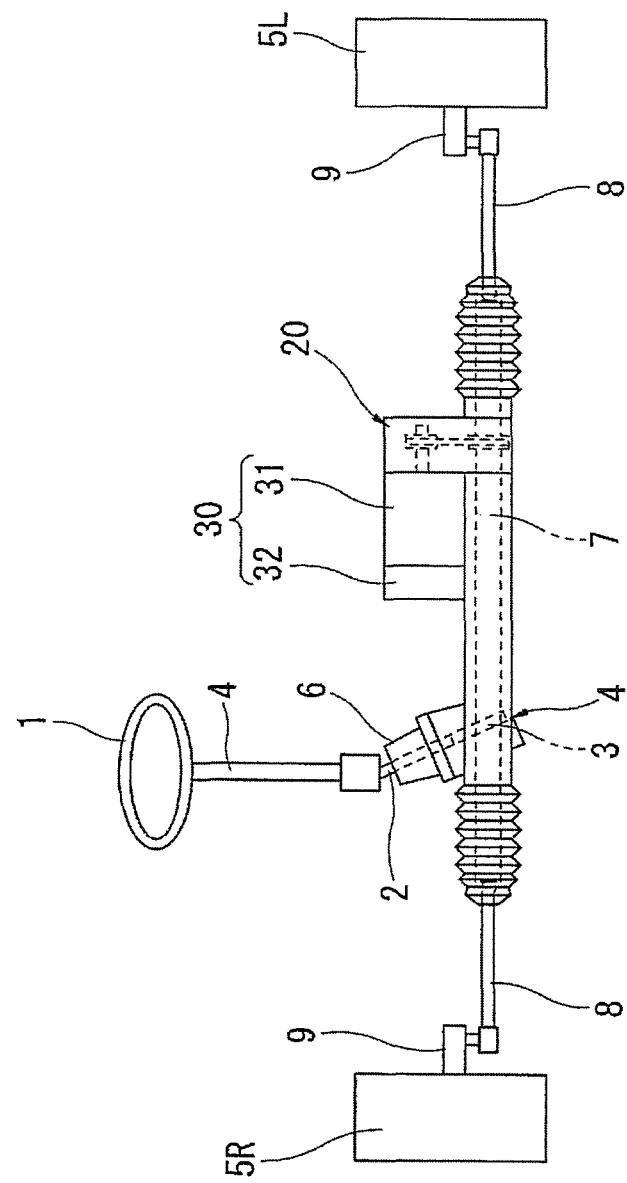
FIG. 1 is a schematic view showing a power steering device according to the present invention.

That is, as shown in FIG. 1, this power steering device includes an input shaft 2 including one end side linked with a steering wheel 1 to rotate as a unit with the steering wheel 1; an output shaft 3 including one end side connected through a torsion bar (not shown) to the other end side of the input shaft 2 to be rotated relative to the other end side of the input shaft 2, and the other end side connected through a rack and pinion mechanism 4 to steered wheels 5L and 5R; a torque sensor 6 disposed on an outer circumference side of the input shaft 2, and arranged to sense a steering torque based on a relative rotation displacement amount between the input shaft 2 and the output shaft 3; a motor unit 30 arranged to provide a steering assist torque according to a steering torque of a driver based on detection results such as the torque sensor 6 and a vehicle speed sensor (not shown), to a rack shaft 7 described later; and a transmitting mechanism 20 arranged to decrease a speed of an output (rotation force) of the motor unit 30, to convert the output into an axial movement force of the rack shaft 7 described later, and to transmit the axial movement force.

The rack and pinion mechanism 4 includes pinion teeth (not shown) formed on an outer circumference of one end portion of the output shaft 3; and rack teeth (not shown) formed in an axial predetermined range of the rack shaft 7 which is a steered (turning) shaft which is disposed to the one end portion of the output shaft 3 substantially perpendicular to the one end portion of the output shaft 3, and which is engaged with the pinion teeth. The rack shaft 7 is arranged to be moved in the axial directions in accordance with the rotation direction of the output shaft 3. Respective ends of the rack shaft 7 are linked, respectively, through tie rods 8 and 8 and knuckle arms 9 and 9 to the steered wheels 5R and 5L. The rack shaft 7 is arranged to be moved in the axial direction to pull the knuckle arms 9 and 9 through the tie rods 8 and 8, and thereby to vary directions of the steered wheels 5R and 5L.

Figure 2:
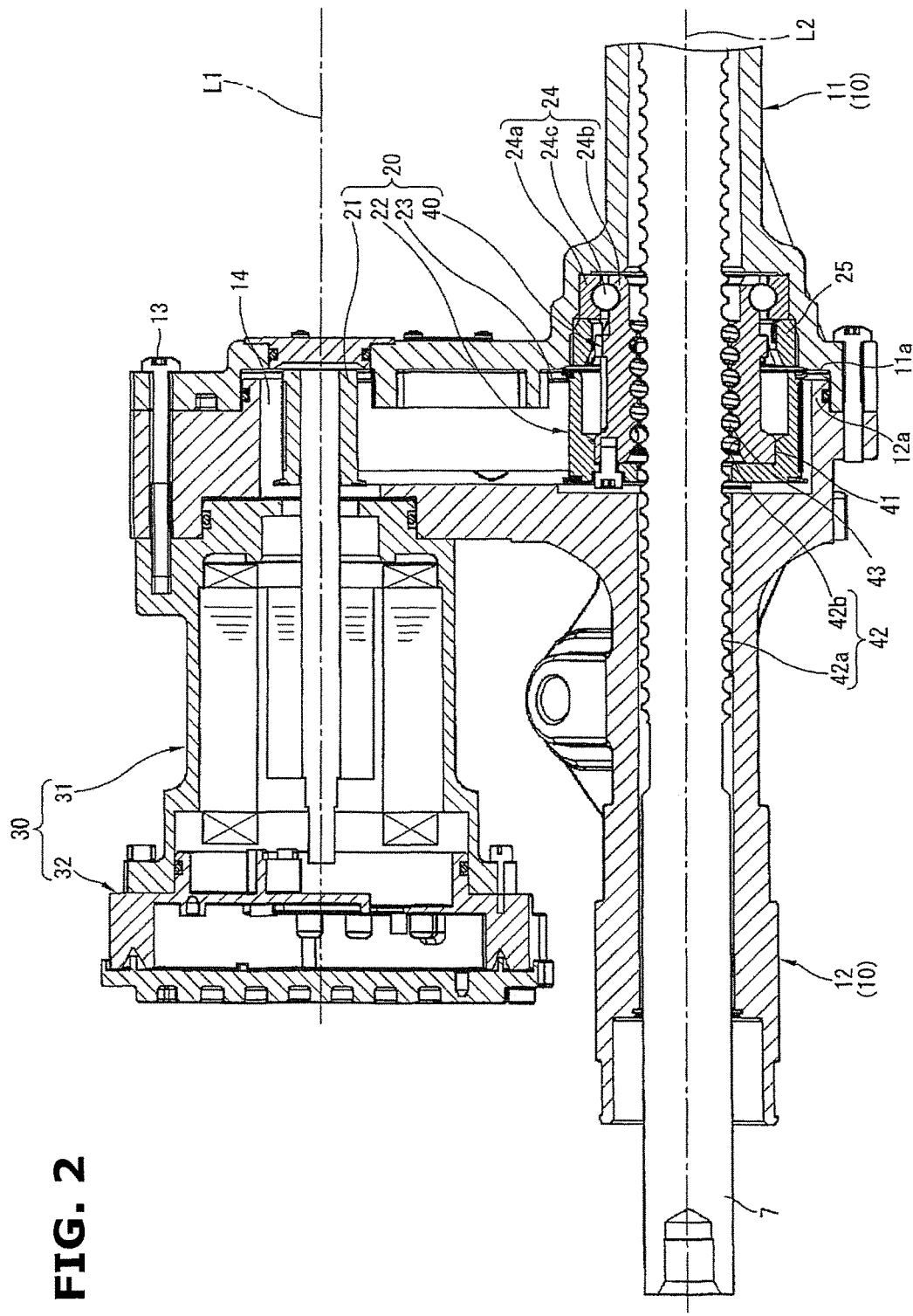
FIG. 2 is an enlarged sectional view showing a portion near a motor unit shown in FIG. 1.

As shown in FIG. 1 and FIG. 2, the rack shaft 7 is received within a gear housing 10 to be moved in the axial direction. The gear housing 10 includes a first gear housing 11 receiving the rack and pinion mechanism 4; and a second gear housing 12 receiving the transmitting mechanism 20. The gear housing 10 is constituted by integrating the first gear housing 11 and the second gear housing 12. The first housing 11 and the second housing 12 are fixed together with the motor unit 30 by being tightened by a plurality of bolts 13 (three in this embodiment) tightening the gear housing 10 and the motor unit 30, in a state where a raised portion 12*a* protruding on a joint end portion of the second housing 12 is mounted in a recessed portion 11*a* formed in a joint end portion of the first gear housing 11.

As shown in FIG. 2, the transmitting mechanism 20 includes an input side pulley 21 provided to an outer circumference of a tip end portion of an output shaft 31*a* of an electric motor 31 described later to rotate as a unit with the output shaft 31*a* of the electric motor 31, and arranged to rotate about an axis L of the output shaft 31*a*; an output side pulley 22 provided to the outer circumference of the rack shaft 7 to be rotated relative to the outer circumference of the rack shaft 7, and arranged to be rotated about an axis L2 of the rack shaft 7 based on the rotation force (torque) of the input side pulley 21; a ball screw 40 disposed between the output shaft side pulley 22 and the rack shaft 7, and arranged to decrease a speed of the rotation of the output side pulley 22, and to convert the speed-decreased rotation to the axial movement of the rack shaft 7; and a belt 23 wound around the input side pulley 21 and the output side pulley 22, and arranged to transmit the rotation of the input side pulley 21 to the output side pulley 22, and thereby to synchronously rotate the both pulleys 21 and 22. The transmitting mechanism 20 is received within a transmitting mechanism receiving portion 14 defined between the joint end portions of the both gear housings 11 and 12.

Figure 3:
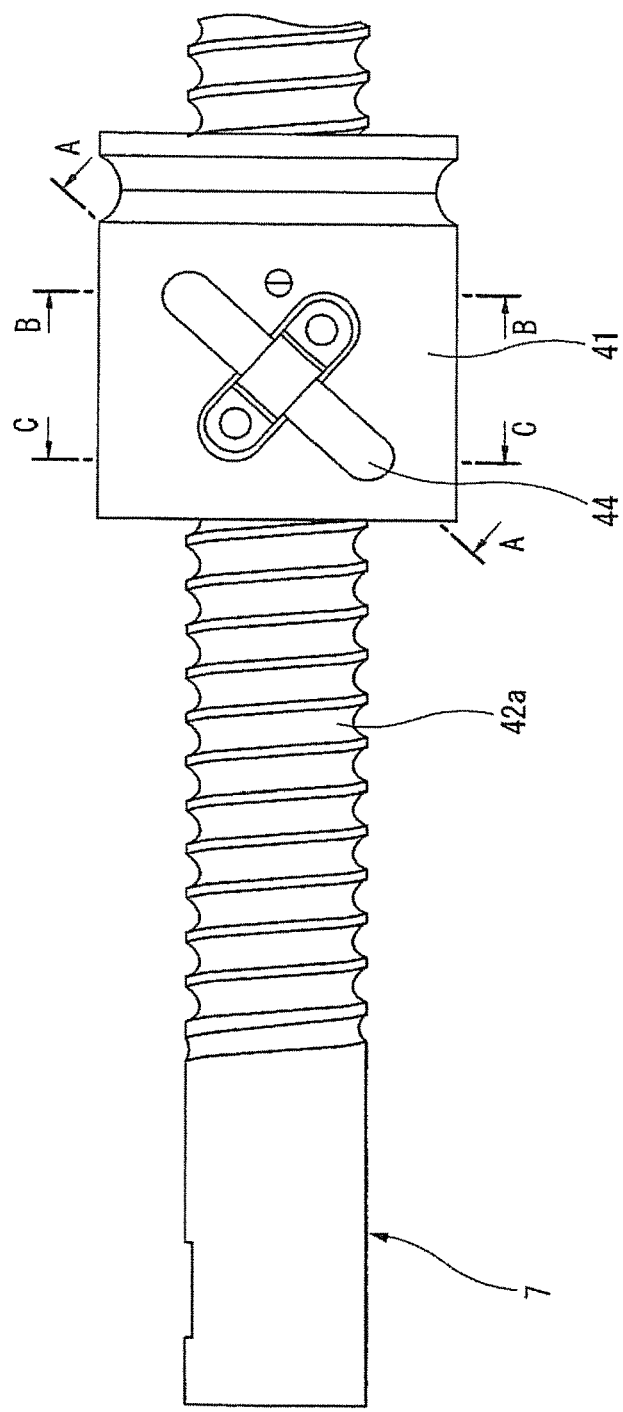
FIG. 3 is a plan view showing a ball screw of FIG. 2.
Figure 4:
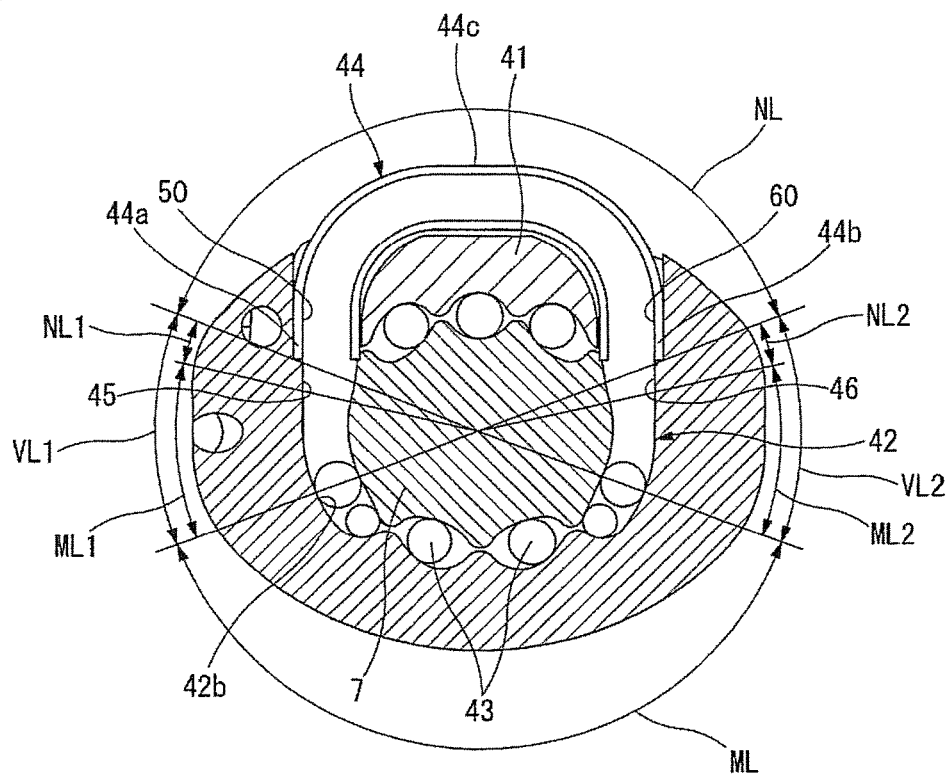
FIG. 4 is a sectional view taken along an A-A line of FIG. 3.

As shown in FIG. 2 to FIG. 4, the ball screw 40 includes a nut 41 formed into a cylindrical shape surrounding the rack shaft 7, and provided to be rotated relative to the rack shaft 7; a ball circulation groove 42 that has a predetermined lead angle, and that is constituted by a shaft side ball screw groove 42*a* which has a helical shape, and which is provided on the outer circumference of the rack shaft 7, and a nut side ball screw groove 42*b* which has a helical shape, and which is provided on an inner circumference of the nut 41; a plurality of balls 43 disposed within the ball circulation groove 42 to be rolled within the ball circulation groove 42; and a tube 44 which is a cylindrical connection member, which connects both ends of the ball circulation groove 42, and which is arranged to circulate the balls 43 between the both end portions of the ball circulation groove 42.

The nut 41 includes an axial one end portion rotatably supported by the first gear housing 11 through a ball bearing 24; and the other end portion having an outer circumference surface on which the output side pulley 22 is mounted and fixed. Besides, the ball bearing 24 includes an inner wheel 24*a* integrally constituted with the nut 41; an outer wheel 24*b* which is press-fit in the inner circumference surface of the first gear housing 11, and which is tightened by a lock nut 25; and a plurality of balls 24*c* disposed between the inner wheel 24*a* and the outer wheel 24*b* to be rolled between the inner wheel 24*a* and the outer wheel 24*b*.

A predetermined grease is applied between the ball screw grooves 42*a* and 42*b*, and between the inner and outer wheels 24*a* and 24*b*, for lubricating the friction according to the rolling movements of the balls 43 and 24*c*.

Figure 5:
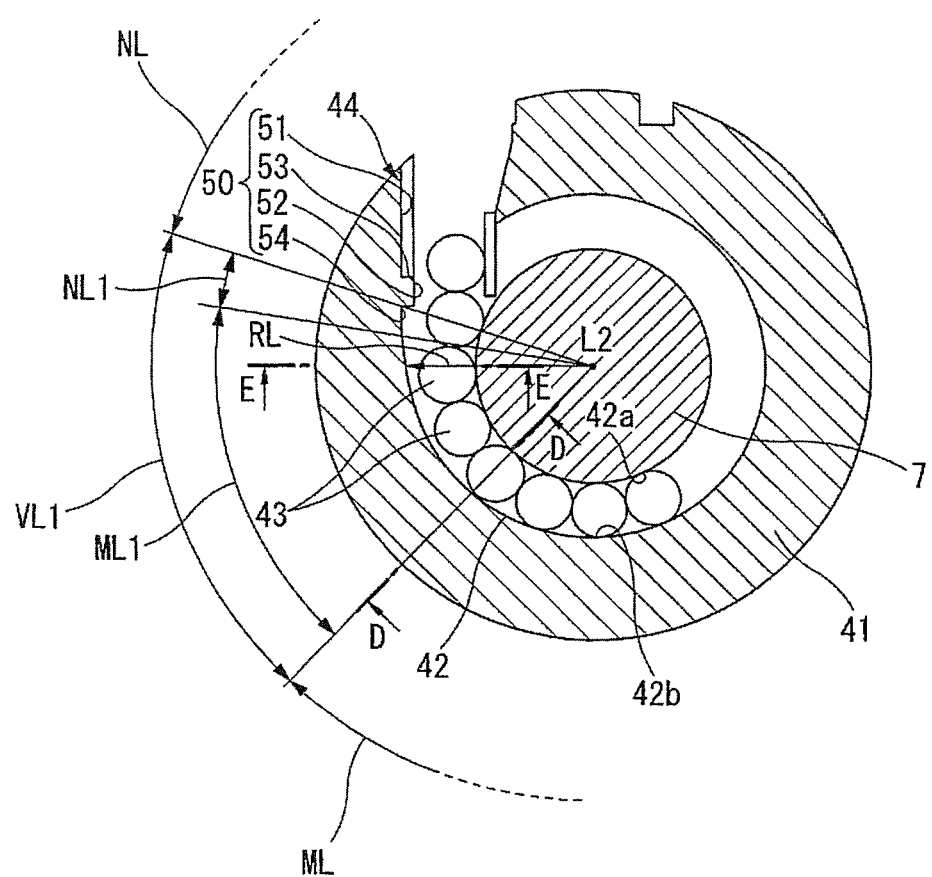
FIG. 5 is a sectional view taken along a B-B line of FIG. 3.
Figure 6:
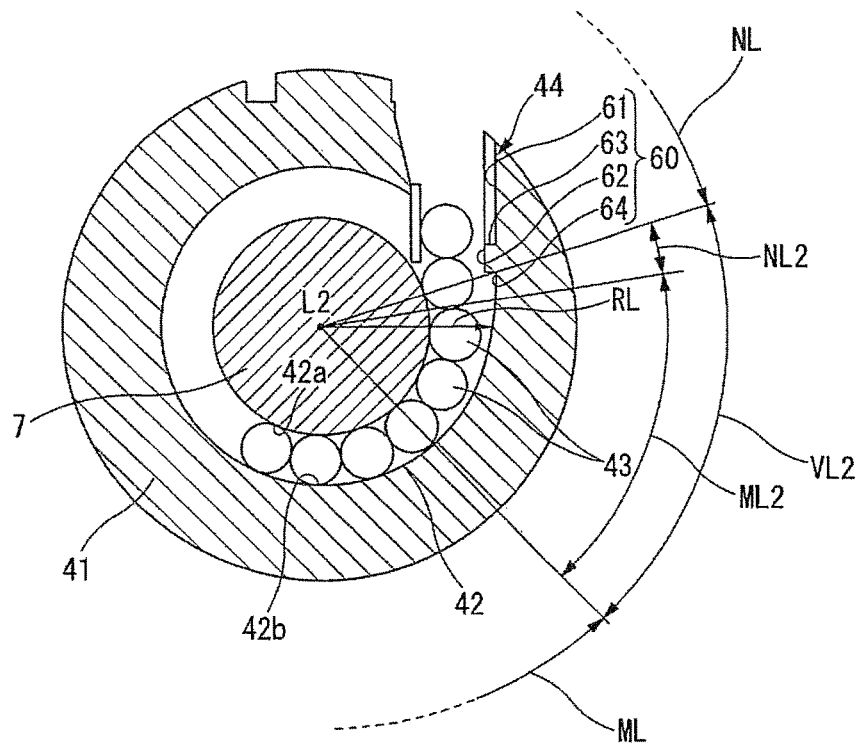
FIG. 6 is a sectional view taken along a C-C line of FIG. 3.

Moreover, as shown in FIG. 4 to FIG. 6, the nut 41 includes a first connection passage 50 which is formed at an axial one end side thereof to penetrate through the nut 41, which is connected to the one end portion of the tube 44, which is arranged to supply or discharge the balls 43 to the ball circulation groove 42, and which is opened to the one end portion of the ball circulation groove 42 (the nut side ball screw groove 42*b*). Similarly, the nut 41 includes a second connection passage 60 which is formed at an axial other end side thereof to penetrate through the nut 41, which is connected to the other end portion of the tube 44, which is arranged to supply or discharge the balls 43 from the ball circulation groove 42, and which is opened to the other end portion of the ball circulation groove 42 (the nut side ball screw groove 42*b*).

The first and second connection passages 50 and 60 include, respectively, first and second large diameter portions 51 and 61 formed on the one end sides to be opened to the outer circumference surfaces of the nut 41, and arranged to connect the tube 44; and a first small diameter portion 52 and a second small diameter portion 62 which are formed into stepped diameter decreasing shapes to decrease diameters from the first and second large diameter portions 51 and 61 toward the other end side, and opened to the inner circumference surface (the nut side ball screw groove 42*b*) of the nut 41. The other ends (the ends on the first and second small diameter portions 52 and 62's side) of the first and second connection passages 50 and 60 are separated from each other at about 180 degrees. The one ends of the first and second connection passages 50 and 60 extend parallel to tangent directions of the ball circulation groove 42. Moreover, a first stepped portion 53 is formed between the first large diameter portion 51 and the first small diameter portion 52. A second stepped portion 63 is formed between the second large diameter portion 61 and the second small diameter portion 62. Besides, an input on the nut 41 side is not acted to a region constituted by the first and second connection passages 50 and 60, and the tube 44. Accordingly, the region constituted by the first and second connection passages 50 and 60, and the tube 44 is a no load region NL in which the input of the nut 41 side is not transmitted to the rack shaft 7.

In this case, the first and second stepped portions 53 and 63 have depth widths which are equal to or larger than an outside diameter of the tube 44. Entire of the end surfaces of the tube 44 are abutted on the first and second stepped portions 53 and 63 in a state where the tube 44 is inserted and mounted in the first and second large diameter portions 51 and 61. The first and second stepped portions 53 and 63 extend in a radially inside direction beyond the inner circumference surface of the tube 44 (on the inner circumference side of the tube 44).

The ball circulation groove 42 includes an intermediate portion having a constant inside diameter substantially identical to a diameter of the balls 43. The ball circulation groove 42 is constituted as a load region ML in which the input from the nut 41 side can be sufficiently transmitted through the balls 43 to the rack shaft 47 side. Moreover, a first predetermined region and a second predetermined region which are predetermined regions on the both end sides of the ball circulation groove 42 are transition regions between the no load region NL and the load region ML. The first predetermined region and the second predetermined region are constituted as first and second load transition regions VL1 and VL2 in which the input load transmitted from the nut 41 side to the rack shaft 7 side can be varied (increased or decreased).

The first and second load transition regions VL1 and VL2 are constituted by the shaft side ball screw groove 42a which has a constant depth substantially identical to a radius of the ball 43, and which has a substantially arc cross section, and the nut side ball screw groove 42b including a first taper portion 45 and a second taper portion 46 in which radial direction distances (hereinafter, referred to as "rack axis distances") RL from the axis L2 of the rack shaft 7 corresponding to the rotation axis of the nut 41 are gradually increased toward the other end side openings of the first and second connection passages 50 and 60.

Moreover, the first and second load transition regions VL1 and VL2 include a first load region ML1 and a second load region ML2 which are formed in a first region and a second region that are on the no load region ML's side of the first and second predetermined ranges constituted by the first and second taper portions 45 and 46, and in which at least a part of the load inputted from the nut 41 side can be transmitted to the rack 7 side; and a first no load region NL1 and a second no load region NL2 which are formed in residual regions, and in which the input from the nut 41 side cannot be transmitted to the rack shaft 7. The first and second load transition regions VL1 and VL2 pass from the other end side openings of the first and second connection passages 50 and 60 through the first and second no load regions NL1 and NL2, and then passes through the first and second load regions ML1 and ML2.

Figure 7:
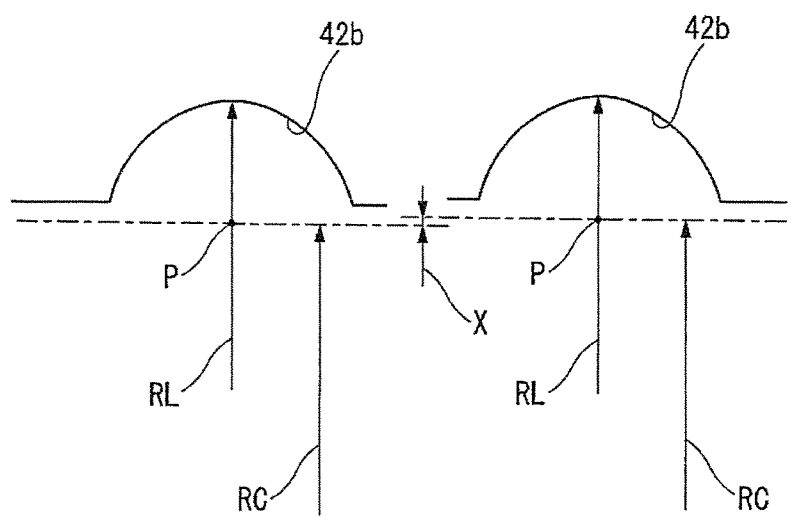
FIG. 7 are lateral sectional views showing a nut side ball screw groove shown in FIG. 5.

Furthermore, the first and second transition regions VL1 and VL2 are formed in ranges in which angles around the axis L2 of the rack shaft 7 corresponding to the rotation axis of the nut 41 are equal to or greater than 15 degrees (in this embodiment, 45 degrees). The first and second load transition regions VL1 and VL2 are constituted so as to simultaneously receive a plurality of the balls 43. As shown in FIG. 7, the first and second taper portions 45 and 46 constituting the first and second load transition regions VL1 and VL2 are constituted by varying only a distance RC to the center P of curvature of the arc surface (hereinafter, referred to "center of curvature distance") (in particular, being offset in the radial direction by X) so that the shapes of the arc surfaces which are the cross section surfaces of the nut side ball screw grooves 42b are identical. This center of the curvature distance RC is gradually varied along the moving direction of the ball 43, that is, along a lead angle of the ball circulation groove 42 (cf. FIG. 4).

Figure 8:
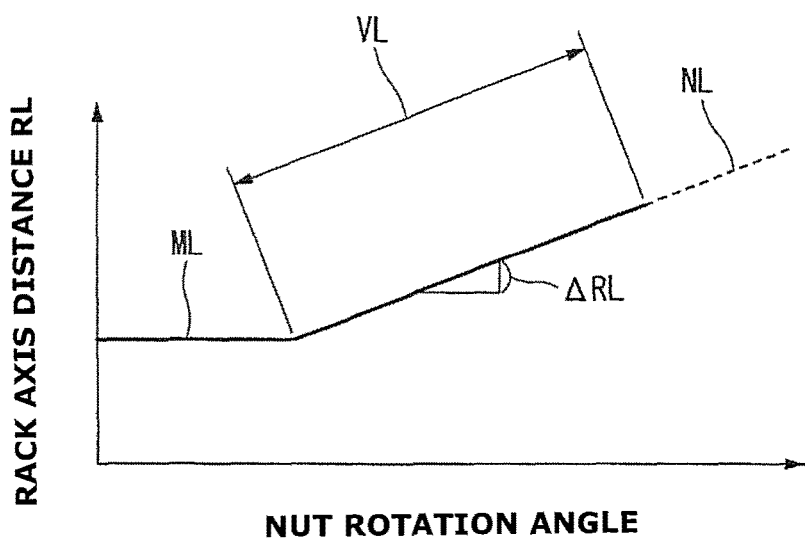
FIG. 8 is a graph showing a rack axis distance in respective regions shown in FIG. 5.

In this case, as shown in FIG. 8, the offset amounts of the first and second load transition regions VL1 and VL2 is set to be linearly increased toward the other end side openings (the no load regions NL) of the first and second connection passages 50 and 60. Moreover, a ratio obtained by dividing the offset amounts X (in this embodiment, 0.5 μm) corresponding to the variation amounts of the radial distances between the axis L2 of the rack shaft 7 and the nut side ball screw groove 42b by the diameter D of the ball 43 (5.55 mm in this embodiment), with respect to angle of one degree around the axis L2 of the rack shaft 7 corresponding to the rotation axis of the nut 41 is set to be 0.2% or less.

In this way, in the first and second load transition regions VL1 and VL2, the taper shapes are formed so that the rack axis distance RL (the center of the curvature distance RC) are gradually increased toward the first and second connection passages 50 and 60, that is, so that the contact areas with the balls 43 are gradually decreased toward the first and second connection passages 50 and 60. The contact areas with the balls 43 are gradually increased in accordance with the forward movement from the first and second connection passages 50 and 60 sides based on these taper shapes, so that the load transmitted by the balls 43 are gradually increased. The contact areas with the balls 43 are gradually decreased in accordance with the rearward movements toward the first and second connection passages 50 and 60 sides based on these taper shapes, so that the load transmitted by the balls 43 are gradually decreased.

Furthermore, the first and second load transition regions VL1 and VL2 are formed so that lengths L in the regions VL1 and VL2 from the end portions on the first connection passage 50 side through the ball circulation groove 42 to the end portion on the second connection passage 60 side are non-integral (non-integer) multiple. In particular, the length L from the end portion of the first load transition region VL1 on the first connection passage 50 side through the ball circulation groove 42 to the end portion of the second load transition region VL2 on the second connection passage 60 side is set to satisfy "$D \times (n+¼) < L < D \times (n+¾)$" where the diameter of the ball 43 is D, and the number of the balls 43 is n.

Moreover, in the first and second load transition regions VL1 and VL2, the end portion of the first load transition region VL1 on the first connection passage 50 side and the end portion of the second load transition region VL2 on the second connection passage 60 side are arranged to be not aligned with each other in the angle around the axis L2 of the rack shaft 7, which corresponds to the rotation angle of the nut 41.

As shown in FIG. 3 to FIG. 6, the tube 44 has a substantially cylindrical shape having a half dividing shape.

The tube 44 includes a first insertion portion 44a inserted into the first large diameter portion 51; a second insertion portion 44b inserted into the second large diameter portion 61; and a connection portion 44c connecting the first insertion portion 44a and the second insertion portion 44b. The first insertion portion 44a and the second insertion portion 44b are formed to be inclined along the lead angle of the ball circulation groove 42 with respect to the connection portion 44c.

Furthermore, in the one end portion and the other end portion of the tube 44, a first guide portion 44d and a second guide portion 44e extend from the inner end portion openings of the first and second small diameter portions 52 and 62 to portions near shaft side ball screw grooves 42a, on the sides to confront the first and second taper portions 45 and 46. The first guide portion 44d and the second guide portion 44e are arranged to guide the balls 43 between the first and second small diameter portions 52 and 62, and the ball circulation groove 42. These first and second guide portions 44d and 44e have tongue piece shape. The first and second guide portions 44d and 44e are constituted to be continuous with the ball circulation groove 42. The first and second guide portions 44d and 44e are formed to be curved shapes by which the balls 43 can be smoothly moved from the first and second small diameter portions 52 side to the ball circulation grove 42 side, or can be smoothly moved from the ball circulation grooves 42 side to the first and second small diameter portions 52 and 62.

As shown in FIG. 2, the motor unit 30 includes an electric motor 31 that includes an axial one end side on which the output shaft 31a protrudes, and which is supported and fixed on the second gear housing 12, and that is arranged to drive and rotate the input side pulley 21, and thereby to generate a steering assist force through the transmitting mechanism 20 to the rack shaft 7; and an electric controller 32 provided to the other end side of the electric motor 31, and configured to drivingly control the electric motor 31 in accordance with predetermined parameters such as a steering torque and a vehicle speed. The motor unit 30 is constituted by integrating the electric motor 31 and the electric controller 32.

Figure 9:
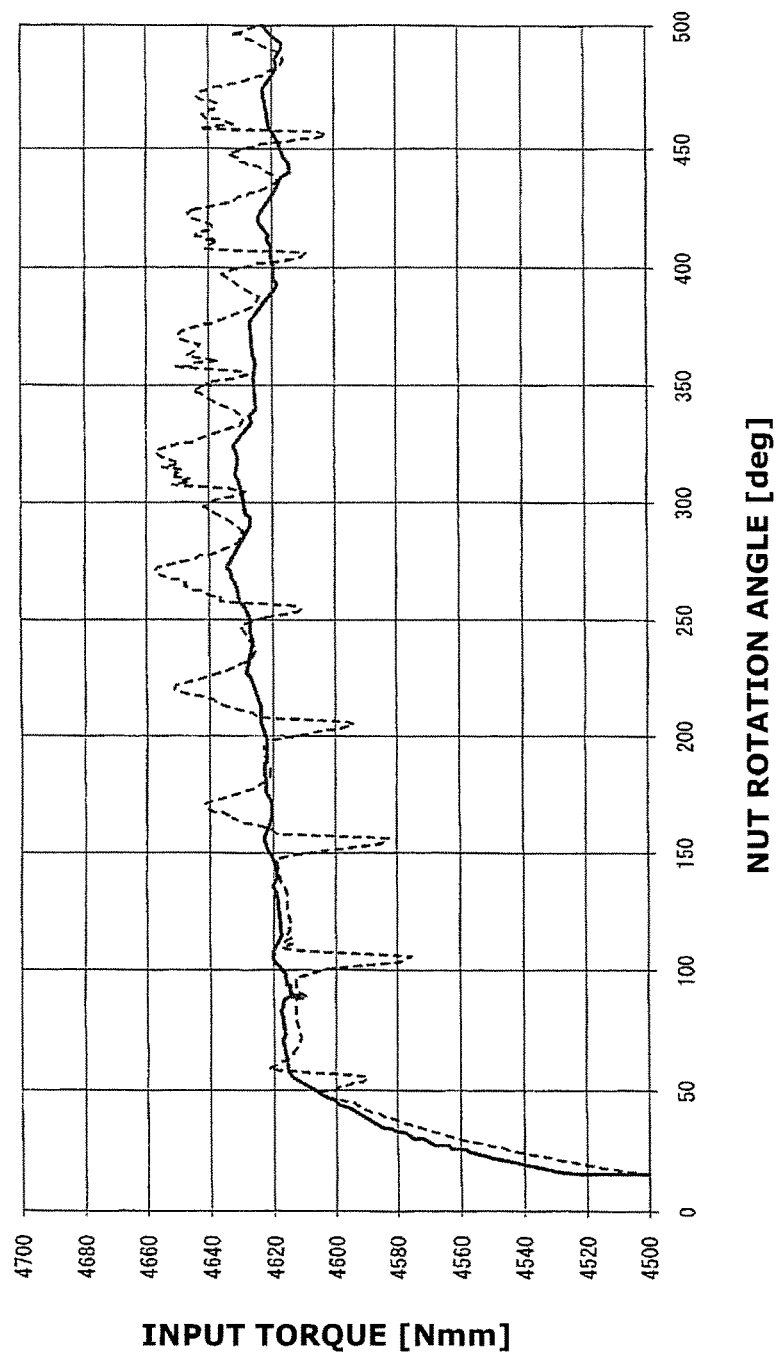
FIG. 9 is a graph showing a relationship of a nut rotation angle—a nut input torque.
Figure 10:
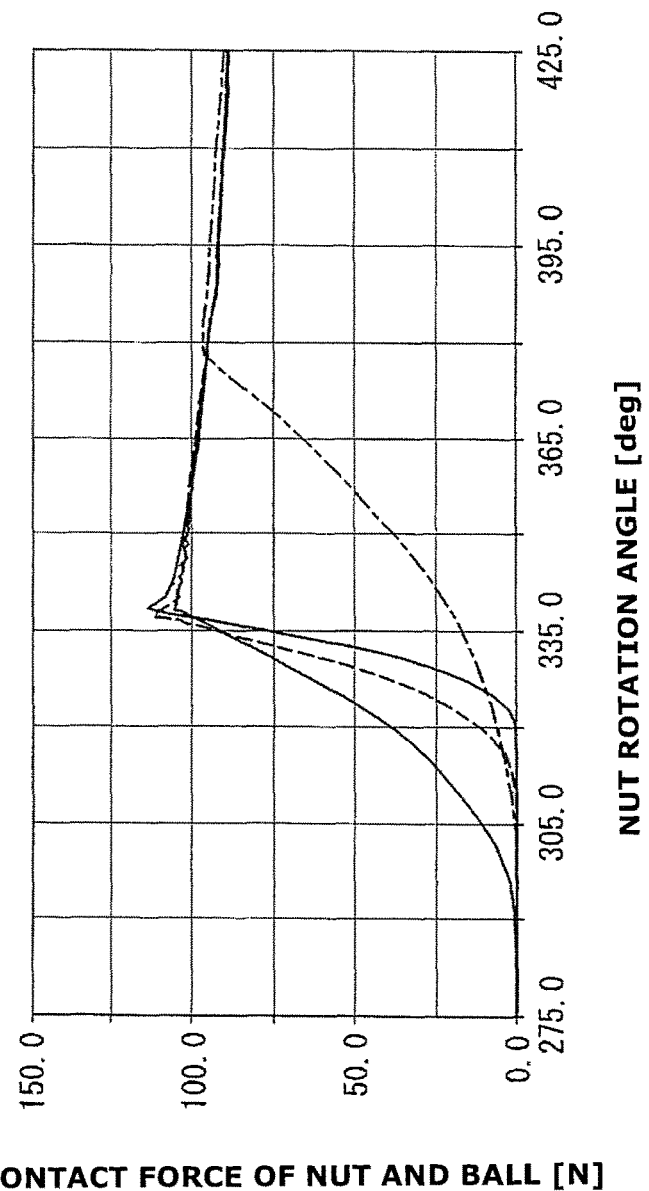
FIG. 10 is a graph showing a relationship of the nut rotation angle—a contact force of the nut and the ball.

Hereinafter, operations and effects of the power steering device according to the present invention are explained with reference to FIG. 5 to FIG. 11. Besides, FIG. 9 is a graph showing a torque variation in the ball screw mechanism. A solid line represents a ball screw in this embodiment. A broken line represents a conventional ball screw. FIG. 10 is a graph showing loads received by the balls at respective gradients of the first and second taper portions (the variation amounts of the rack axis distance RL per unit rotation angle of the nut 41) ΔRL. A solid line represents a case of 5 μm identical to that in this embodiment. A broken line represents a case of 10 μm. A dot line represents a case of 15 μm. One dot chain line represents a case of 3 μm.

First, an operation state of the ball screw 40 in the power steering device are explained. As shown in FIG. 5, for example, the balls 43 passing through the tube 44 and the first connection passage 50 which are the no load region NL are introduced by the first guide portion 44a into the ball circulation groove 42. The balls 43 pass through the predetermined first no load region NL1 in the first load transition region VL1. Then, the balls 43 are shifted to the first load region ML1 formed in the first region.

That is, in the first load transition region VL1, after the balls 43 passes through the first no load region NL1, the contact area between the ball circulation groove 42 and the balls 43 is gradually increased based on the taper shape of the first taper portion 45 of the nut side ball screw groove 42b. The load transmitted by the balls 43 from the nut 41 side to the rack shaft 7 side is gradually increased in accordance with the increase of the contact area. Then, after the balls 43 passes through the first load region ML1 of this first load transition region VL1, it is shifted to the load region ML. With this, the input load from the nut 41 side is sufficiently transmitted to the rack shaft 7 side.

On the other hand, as shown in FIG. 6, on the outlet side of the ball circulation groove 42, in the balls 43 passed through the load region ML, the contact areas between the ball circulation groove 42 and the balls 43 are gradually decreased based on the taper shape of the second taper portion 46 of the nut side ball screw groove 42b in the second load transition region VL2. The load transmitted by the balls 43 from the nut 43 side to the rack shaft 7 side is gradually decreased in accordance with the decrease of the contact area. Then, after the balls 43 pass through the second load region ML2 of the second load transition region VL2, the balls 43 passed through the second no load region NL2 of the second load transition region VL2 are guided by the second guide portion 44b into the second connection passage 60. It is shifted to the no load region NL constituted by the second connection passage 60 and the tube 44. The balls 43 do not transmit the input load from the nut 41 side to the rack shaft 7 side until the balls 43 pass through the no load region NL.

Next, the torque variation in the ball screw mechanism is compared with that of the comparative example. As shown in FIG. 9, in the comparative example, it is suddenly shifted from the no load state constituted by the diameter increasing taper processed portion to the load state. Accordingly, the load acted to the balls is suddenly varied, so that the torque variation of the ball screw mechanism becomes large (cf. the broken line in the drawing). On the other hand, as described above, in the ball screw 40 according to this embodiment, there are provided the first and second load transition regions VL1 and VL2 which are provided to the end portions of the ball circulation groove 42 (the nut side ball screw groove 42b) on the first and second connection passage 50 and 60 sides, and which are constituted by the first and second taper portions 45 and 46. With this, the load acted to the balls 43 is gradually increased on the inlet side, and gradually decreased on the outlet side. With this, the transmission of the forces of the balls 43 moved between the no load region NL and the load region ML are smoothed, so that the torque variation of the ball screw 40 is suppressed.

Moreover, in the torque variation suppressing function of the ball screw 40, the contact force between the nut 41 and the ball 43 at each gradient of the taper portions 45 and 46, that is, at each variation amount ΔRL of the rack axis distance per the unit rotation angle of the nut 41 is checked. As shown in FIG. 10, when the variation amount ΔRL of the rack axis distance is 3 μm to 10 μm, it is possible to obtain a gentle gradient. On the other hand, when the variation amount ΔRL of the rack axis distance is 15 μm, the gradient of each of the taper portions 45 and 46 is large. It was confirmed that it is insufficient for suppressing the torque variation. That is, by these results, it was confirmed that a criteria (reference) for sufficiently suppressing the torque variation of the ball screw 40 is that the ratio obtained by dividing the variation amount ΔRL of the rack axis distance per unit rotation angle of the nut 41 by the diameter D is equal to or smaller than 0.2%.

As described above, in the power steering device according to this embodiment, there are provided the first and second load transition regions VL1 and VL2. With this, the load acted to the ball 43 is gradually increased on the inlet side, and gradually decreased on the outlet side. Accordingly, it is possible to smooth the transmission of the force of the ball 43 moved between the no load region NL and the load region ML. With this, the torque variation is suppressed at the operation of the ball screw 40. The catching (hooking) feeling of the ball screw 40 due to the torque variation is suppressed. Consequently, it is possible to improve the steering feeling.

Moreover, in particular, in the power steering device, switching points between the first and second no load regions NL1 and NL2 which are the no load regions, and the first and second load regions ML1 and ML2 which are the load regions are provided within the first and second load transition regions VL1 and VL2. Accordingly, it is possible to suppress the sudden variation in the load region ML.

Moreover, the first and second load transition regions VL1 and VL2 are formed so that the cross section areas on the bottom sides of the nut side ball screw groove 42*b* are substantially constant (identical), that is, so that the radial position of the bottom surface of the nut side ball groove 42*b* is offset toward the outside. With this, the widthwise size of the nut ball screw groove 42*b* in the movement direction of the ball 43 is not varied. Consequently, it is possible to suppress the wobbling of the balls 43 entering from the no load region NL, and to ensure the smooth movement of the ball 43.

Moreover, by the above-described configuration, it is possible to form the load transition regions VL1 and VL2 only by controlling the feed rate of the cutting tool arranged to cut the nut side ball screw groove 42*b*.

Furthermore, the first and second load transition regions VL1 and VL2 are constituted so that the rack axis distance RL in the transition regions VL1 and VL2 are gradually varied along the lead angle of the ball circulation groove 42 which is the movement direction of the ball 43. Accordingly, it is possible to further smooth the variation of the load according to the movement of the ball 43.

Moreover, in the power steering device, the tube 44 is formed so that the first and second insertion portions 44*a* and 44*b* are inclined with respect to the connection portion 44*c* along the lead angle of the ball circulation groove 42. Accordingly, the balls 43 are moved into and out of the tube 44 in the direction along the lead angle of the ball circulation groove 42. Consequently, it is possible to further smooth the movements of the balls into and out of the tube 44.

Furthermore, in the above-described configuration, the first connection passage 50 and the second connection passage 60 are formed so that the other end of the first connection passage 50 and the other end of the second connection passage 60 are apart from each other at about 180 degrees in the circumferential direction around the axis L2 of the rack shaft 7 which is the rotation axis of the nut 41. Accordingly, even when the movement directions of the balls 43 into and out of the ball circulation groove 42 become closer to the tangent direction, it is possible to smoothly assemble the tube 44, and thereby to improve the assembly operation of the device.

Moreover, in the first and second connection passages 50 and 60, in a case where the inner circumference portion of the tube 44 protrudes radially inside the first and second stepped portions 53 and 63, the ball 43 passed through the tube 44 is moved to the first and second load transition regions to fly over (jump across) the end portions of the first and second load transition regions VL1 and VL2 on the tube 44 side. Consequently, the loads of the balls 43 are suddenly varied.

Accordingly, in the power steering device, in the first and second connection passages 50 and 60, the first and second stepped portions 53 and 63 extend in the radially inside direction beyond the inner circumference surface of the tube 44. The balls 43 can pass through the first and second load transition regions VL1 and VL2 with the longer time contacts. Accordingly, it is possible to further slow (moderate) the load variation of the balls 43.

Moreover, the first and second load transition regions VL1 and VL2 are configured to simultaneously receive the plurality of the balls 43. Accordingly, the variations of the loads of the balls 43 within the transition regions VL1 and VL2 can be the average of the variations of the loads of the plurality of the balls 43. Consequently, it is possible to further suppress the load variations of the balls 43, and to more effectively suppress the catching (hooking) feeling of the ball screw 40.

Furthermore, the first and second load regions ML1 and ML2 in which the loads of the balls 43 are varied are configured to simultaneously receive the plurality of the balls 43. Accordingly, the variations of the loads of the balls 43 within the regions ML1 and ML2 can be the average of the variations of the loads of the plurality of the balls 43. Accordingly, it is possible to further slow (moderate) the generation of the variation of the load of the balls 43.

Figure 11:
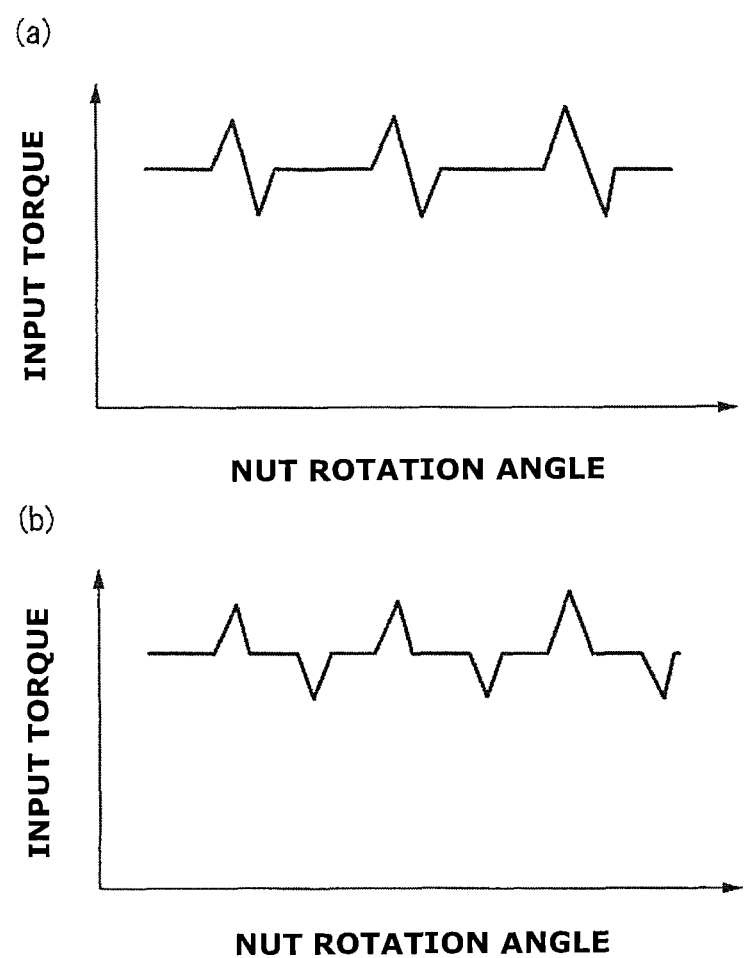
FIG. 11 are graphs showing a relationship of the nut rotation angle—the nut input torque.

Moreover, in the first and second load transition regions VL1 and VL2, when the length L from the end of the first load transition region VL1 on the first connection passage 50 side through the ball circulation groove 42 to the end portion of the second load transition region VL2 on the second connection passage 60 side is the integer multiple of the diameter D of the ball 43, a timing at which the load is started to be acted to the balls 43 in the transition regions VL1 and VL2 corresponds to a timing at which the load is started to be released, as shown in FIG. 11(*a*). Accordingly, the load variations of the ball screw 40 become large.

In the power steering device, the length L from the end portion of the first load transition region VL1 on the first connection passage 50 side through the ball circulation groove 42 to the end portion of the second load transition region VL2 on the second connection passage 60 side in the first and second load transition regions VL1 and VL2 is non-integer multiple of the diameter of the ball 43. Accordingly, as shown in FIG. 11(*b*), the timing at which the load is started to be acted to the ball 43 in the load transition regions VL1 and VL2 is deviated from the timing at which the load is started to be released from the ball 43. Consequently, it is possible to suppress the load variation of the ball screw 40, and thereby to further improve the steering feeling.

The load transition regions VL1 and VL2 are configured so that the length L satisfies "$D \times (n+\frac{1}{4}) < L < D \times (n+\frac{3}{4})$" where the diameter of the ball 43 is D, the number of the balls 43 is n. Accordingly, it is possible to effectively suppress the load variation in the ball screw 40.

The present invention is not limited to the above-described embodiment. For example, the forming regions of the first and second load transition regions VL1 and VL2 may be freely varied in accordance with specifications and so on of the power steering device as long as it is deviated from the gist of the present invention.

For example, following aspects are conceivable as the power steering device according to the above-described embodiment.

That is, in one aspect, a power steering device includes: a steered shaft arranged to be moved in an axial direction in accordance with a rotation of a steering wheel, and thereby to steer a steered wheel; a nut formed into a cylindrical shape surrounding the steered shaft, and arranged to be rotated relative to the steered shaft; a ball circulation groove including a shaft side ball screw groove having a helical groove shape, and provided on an outer circumference of the steered shaft, and a nut side ball screw groove having a helical groove shape, and provided on an inner circumference of the nut; a plurality of balls disposed within the ball circulation groove to be rolled within the ball circulation groove; a first connection passage including one end side opened on an outer circumference surface of the nut, and the other end side opened on an inner circumference surface of the nut, and opened on the one end side of the ball circulation groove; a second connection passage including one end side opened on the outer circumference surface of the nut, and the other end side opened on the inner circumference surface of the nut, and opened on the other end side of the ball circulation groove; a connection member connecting the first connection passage and the second connection passage to circulate the balls between the first connection passage and the second connection passage; an electric motor arranged to drive and rotate the nut, and thereby to provide a steering force to the steered shaft; a first load transition region provided in a first predetermined range in the nut side ball screw groove from the other end side opening of the first connection passage along the nut ball screw groove, formed so that a radial distance between a rotation axis of the nut and the nut side ball screw groove is gradually increased toward the other end side opening of the first connection passage, and formed so that the balls pass through a first no load region in which a load is not transmitted from the nut side to the steered shaft side, and then the balls pass through a first load region in which the load is transmitted from the nut side to the steered shaft side, when the balls in the first predetermined range are moved from the other end side opening of the first connection passage along the nut side ball screw groove; and a second load transition region provided in a second predetermined range in the nut side ball screw groove from the other end side opening of the second connection passage along the nut side ball screw groove, formed so that a radial distance between the rotation axis of the nut and the nut side ball screw groove is gradually increased toward the other end side opening of the second connection passage, and formed so that the balls pass through a second no load region in which the load is not transmitted from the nut side to the steered shaft side, and then the balls pass through a second load region in which the load is transmitted from the nut side to the steered shaft side, when the balls in the second predetermined range are moved from the other end side opening of the second connection passage along the nut side ball screw groove.

In a preferable aspect of the power steering device, the connection member includes a first insertion portion inserted into the first connection passage, a second insertion portion inserted into the second connection passage, and a connection portion connecting the first insertion portion and the second connection portion; and the first insertion portion and the second insertion portion are inclined along a lead angle of the nut side ball screw groove with respect to the connection portion.

In another preferable aspect in one of the aspects of the power steering devices, the connection member is formed into a cylindrical shape; the first connection passage includes a first stepped portion on which one end surface of the connection member is abutted; the first stepped portion extends radially inside the connection member beyond an inner circumference surface of the connection member; the second connection passage includes a second stepped portion on which the other end surface of the connection member is abutted; and the second stepped portion extends radially inside the connection member beyond the inner circumference surface of the connection member.

In still another preferable aspect in one of the aspects of the power steering devices, the first load transition region and the second load transition region are formed, respectively, in ranges in which the plurality of the balls are simultaneously received.

In still another preferable aspect in one of the aspects of the power steering devices, the first load region and the second load region are formed, respectively, in ranges in which the plurality of the balls are simultaneously received.

In still another preferable aspect in one of the aspects of the power steering devices, the first load transition region and the second load transition region are formed so that a length of a portion from an end portion of the first transition region on the first connection passage side through the ball circulation groove to an end portion of the second load transition region on the second connection passage side is non-integer multiple of a diameter of one of the balls.

In still another preferable aspect in one of the aspects of the power steering devices, cross sectional shapes on a bottom side of the nut side ball screw groove are substantially identical in the first load transition region; and cross sectional shapes on the bottom side of the nut side ball screw groove are substantially identical in the second load transition region.

In still another preferable aspect in one of the aspects of the power steering devices, the first connection passage and the second connection passage are formed so that the other end of the first connection passage and the other end of the second connection passage are apart from each other at substantially 180 degrees in a circumferential direction around the rotation axis of the nut.

In still another preferable aspect in one of the aspects of the power steering devices, the first load transition region and the second load transition region are formed so that a length of a portion from an end portion of the first transition region on the first connection passage side through the ball circulation groove to an end portion of the second load transition region on the second connection passage side is non-integer multiple of a diameter of one of the balls.

In still another preferable aspect in one of the aspects of the power steering devices, the first load transition region and the second load transition region are formed to satisfy a following equation:

$$D\times(n+1/4)<L<D\times(n+3/4) \qquad \text{equation:}$$

where a length of a portion from the end portion of the first load transition region on the first connection passage side through the ball circulation groove to the end portion of the second load transition region on the second connection passage side is L, the diameter of the ball is D, and a number of the balls is n.

From another point of view, a power steering device includes: a steered shaft arranged to be moved in an axial direction in accordance with a rotation of a steering wheel, and thereby to steer a steered wheel; a nut formed into a cylindrical shape surrounding the steered shaft, and arranged to be rotated relative to the steered shaft; a ball circulation groove including a shaft side ball screw groove having a helical groove shape, and provided on an outer circumference of the steered shaft, and a nut side ball screw groove having a helical groove shape, and provided on an inner circumference of the nut; a plurality of balls disposed within the ball circulation groove to be rolled within the ball circulation groove; a first connection passage including one end side opened on an outer circumference surface of the nut, and the other end side opened on an inner circumference surface of the nut, and opened on the one end side of the ball circulation groove; a second connection passage including one end side opened on the outer circumference surface of the nut, and the other end side opened on the inner circumference surface of the nut, and opened on the other end side of the ball circulation groove; a connection member connecting the first connection passage and the second connection passage to circulate the balls between the first connection passage and the second connection passage; an electric motor arranged to drive and rotate the nut, and thereby to provide a steering force to the steered shaft; a first load transition region provided in a first predetermined range in the nut side ball screw groove from the other end side opening of the first connection passage along the nut ball screw groove, formed so that a radial distance between a rotation axis of the nut and the nut side ball screw groove is gradually increased toward the other end side opening of the first connection passage, and formed so that the balls pass through a first no load region in which a load is not transmitted from the nut side to the steered shaft side, and then the balls pass through a first load region in which the load transmitted from the nut side to the steered shaft side is gradually increased, when the balls in the first predetermined range are moved from the other end side opening of the first connection passage along the nut side ball screw groove; and a second load transition region provided in a second predetermined range in the nut side ball screw groove from the other end side opening of the second connection passage along the nut side ball screw groove, formed so that a radial distance between the rotation axis of the nut and the nut side ball screw groove is gradually increased toward the other end side opening of the second connection passage, and formed so that the balls pass through a second no load region in which the load is not transmitted from the nut side to the steered shaft side, and then the balls pass through a second load region in which the load transmitted from the nut side to the steered shaft side is gradually increased, when the balls in the second predetermined range are moved from the other end side opening of the second connection passage along the nut side ball screw groove.

In a preferable aspect of the power steering device, the connection member includes a first insertion portion inserted into the first connection passage, a second insertion portion inserted into the second connection passage, and a connection portion connecting the first insertion portion and the second connection portion; and the first insertion portion and the second insertion portion are inclined along a lead angle of the nut side ball screw groove with respect to the connection portion.

In another preferable aspect in one of the aspects of the power steering devices, the first connection passage and the second connection passage are formed so that the other end of the first connection passage and the other end of the second connection passage are apart from each other at substantially 180 degrees in a circumferential direction around the rotation axis of the nut.

In still another preferable aspect in one of the aspects of the power steering devices, the connection member is formed into a cylindrical shape; the first connection passage includes a first stepped portion on which one end surface of the connection member is abutted; the first stepped portion extends radially inside the connection member beyond an inner circumference surface of the connection member; the second connection passage includes a second stepped portion on which the other end surface of the connection member is abutted; and the second stepped portion extends radially inside the connection member beyond the inner circumference surface of the connection member.

In still another preferable aspect in one of the aspects of the power steering devices, the first load transition region and the second load transition region are formed, respectively, in ranges in which the plurality of the balls are simultaneously received.

In still another preferable aspect in one of the aspects of the power steering devices, the first load region and the second load region are formed, respectively, in ranges in which the plurality of the balls are simultaneously received.

In still another preferable aspect in one of the aspects of the power steering devices, the first load transition region and the second load transition region are formed so that a length of a portion from an end portion of the first transition region on the first connection passage side through the ball circulation groove to an end portion of the second load transition region on the second connection passage side is non-integer multiple of a diameter of one of the balls.

In still another preferable aspect in one of the aspects of the power steering devices, the first load transition region and the second load transition region are formed to satisfy a following equation:

$$D\times(n+\tfrac{1}{4}) < L < D\times(n+\tfrac{3}{4})$$

equation:

where a length of a portion from the end portion of the first load transition region on the first connection passage side through the ball circulation groove to the end portion of the second load transition region on the second connection passage side is L, the diameter of the ball is D, and a number of the balls is n.

In still another preferable aspect in one of the aspects of the power steering devices, the first load transition region is formed so that a radial distance between the rotation axis of the nut and the nut side ball screw groove in the first load transition region is gradually varied in a movement direction of the ball; and the second load transition region is formed so that a radial distance between the rotation axis of the nut and the nut side ball screw groove in the second load transition region is gradually varied in a movement direction of the ball.

In still another preferable aspect in one of the aspects of the power steering devices, cross sectional shapes on a bottom side of the nut side ball screw groove are substantially identical in the first load transition region; and cross sectional shapes on the bottom side of the nut side ball screw groove are substantially identical in the second load transition region.

The invention claimed is:
1. A power steering device comprising:
   a steered shaft configured to be moved in an axial direction in accordance with a rotation of a steering wheel, and thereby to steer a steered wheel;
   a nut formed into a cylindrical shape surrounding the steered shaft, and configured to be rotated relative to the steered shaft;
   a ball circulation groove including a shaft side ball screw groove having a helical groove shape, and provided on an outer circumference of the steered shaft, and a nut side ball screw groove having a helical groove shape, and provided on an inner circumference of the nut;
   a plurality of balls disposed within the ball circulation groove to be rolled within the ball circulation groove;

a first connection passage including one end side opened on an outer circumference surface of the nut, and the other end side opened on an inner circumference surface of the nut, and opened on the one end side of the ball circulation groove;

a second connection passage including one end side opened on the outer circumference surface of the nut, and the other end side opened on the inner circumference surface of the nut, and opened on the other end side of the ball circulation groove;

a connection member connecting the first connection passage and the second connection passage to circulate the balls between the first connection passage and the second connection passage;

an electric motor configured to drive and rotate the nut, and thereby to provide a steering force to the steered shaft;

a first load transition region provided in a first predetermined range in the nut side ball screw groove from the other end side opening of the first connection passage along the nut ball screw groove, formed so that a radial distance between a rotation axis of the nut and the nut side ball screw groove is gradually increased toward the other end side opening of the first connection passage, and formed so that the balls pass through a first no load region in which a load is not transmitted from the nut side to the steered shaft side, and then the balls pass through a first load region in which the load is transmitted from the nut side to the steered shaft side, when the balls in the first predetermined range are moved from the other end side opening of the first connection passage along the nut side ball screw groove; and a second load transition region provided in a second predetermined range in the nut side ball screw groove from the other end side opening of the second connection passage along the nut side ball screw groove, formed so that a radial distance between the rotation axis of the nut and the nut side ball screw groove is gradually increased toward the other end side opening of the second connection passage, and formed so that the balls pass through a second no load region in which the load is not transmitted from the nut side to the steered shaft side, and then the balls pass through a second load region in which the load is transmitted from the nut side to the steered shaft side, when the balls in the second predetermined range are moved from the other end side opening of the second connection passage along the nut side ball screw groove, wherein the first load transition region and the second load transition region are formed so that a length of a portion from an end portion of the first transition region on the first connection passage side through the ball circulation groove to an end portion of the second load transition region on the second connection passage side is a non-integer multiple of a diameter of one of the balls.

2. The power steering device as claimed in claim 1, wherein the connection member includes a first insertion portion inserted into the first connection passage, a second insertion portion inserted into the second connection passage, and a connection portion connecting the first insertion portion and the second connection portion; and the first insertion portion and the second insertion portion are inclined along a lead angle of the nut side ball screw groove with respect to the connection portion.

3. The power steering device as claimed in claim 2, wherein the first connection passage and the second connection passage are formed so that the other end of the first connection passage and the other end of the second connection passage are apart from each other at substantially 180 degrees in a circumferential direction around the rotation axis of the nut.

4. The power steering device as claimed in claim 1, wherein the connection member is formed into a cylindrical shape; the first connection passage includes a first stepped portion on which one end surface of the connection member is abutted; the first stepped portion extends radially inside the connection member beyond an inner circumference surface of the connection member; the second connection passage includes a second stepped portion on which the other end surface of the connection member is abutted; and the second stepped portion extends radially inside the connection member beyond the inner circumference surface of the connection member.

5. The power steering device as claimed in claim 1, wherein the first load transition region and the second load transition region are formed, respectively, in ranges in which the plurality of the balls are simultaneously received.

6. The power steering device as claimed in claim 5, wherein the first load region and the second load region are formed, respectively, in ranges in which the plurality of the balls are simultaneously received.

7. The power steering device as claimed in claim 1, wherein the first load transition region and the second load transition region are formed to satisfy a following equation:

$$D \times (n+\tfrac{1}{4}) < L < D \times (n+\tfrac{3}{4})$$ equation:

where a length of a portion from the end portion of the first load transition region on the first connection passage side through the ball circulation groove to the end portion of the second load transition region on the second connection passage side is L, the diameter of the ball is D, and a number of the balls is n.

8. The power steering device as claimed in claim 1, wherein the first load transition region is formed so that a radial distance between the rotation axis of the nut and the nut side ball screw groove in the first load transition region is gradually varied in a movement direction of the ball, and the second load transition region is formed so that a radial distance between the rotation axis of the nut and the nut side ball screw groove in the second load transition region is gradually varied in a movement direction of the ball.

9. The power steering device as claimed in claim 1, wherein cross sectional shapes on a bottom side of the nut side ball screw groove are substantially identical in the first load transition region; and cross sectional shapes on the bottom side of the nut side ball screw groove are substantially identical in the second load transition region.

10. A power steering device comprising:
a steered shaft configured to be moved in an axial direction in accordance with a rotation of a steering wheel, and thereby to steer a steered wheel;
a nut formed into a cylindrical shape surrounding the steered shaft, and configured to be rotated relative to the steered shaft;
a ball circulation groove including a shaft side ball screw groove having a helical groove shape, and provided on an outer circumference of the steered shaft, and a nut side ball screw groove having a helical groove shape, and provided on an inner circumference of the nut;
a plurality of balls disposed within the ball circulation groove to be rolled within the ball circulation groove;

a first connection passage including one end side opened on an outer circumference surface of the nut, and the other end side opened on an inner circumference surface of the nut, and opened on the one end side of the ball circulation groove;

a second connection passage including one end side opened on the outer circumference surface of the nut, and the other end side opened on the inner circumference surface of the nut, and opened on the other end side of the ball circulation groove;

a connection member connecting the first connection passage and the second connection passage to circulate the balls between the first connection passage and the second connection passage;

an electric motor configured to drive and rotate the nut, and thereby to provide a steering force to the steered shaft;

a first load transition region provided in a first predetermined range in the nut side ball screw groove from the other end side opening of the first connection passage along the nut ball screw groove, formed so that a radial distance between a rotation axis of the nut and the nut side ball screw groove is gradually increased toward the other end side opening of the first connection passage, and formed so that the balls pass through a first no load region in which a load is not transmitted from the nut side to the steered shaft side, and then the balls pass through a first load region in which the load transmitted from the nut side to the steered shaft side is gradually increased, when the balls in the first predetermined range are moved from the other end side opening of the first connection passage along the nut side ball screw groove; and a second load transition region provided in a second predetermined range in the nut side ball screw groove from the other end side opening of the second connection passage along the nut side ball screw groove, formed so that a radial distance between the rotation axis of the nut and the nut side ball screw groove is gradually increased toward the other end side opening of the second connection passage, and formed so that the balls pass through a second no load region in which the load is not transmitted from the nut side to the steered shaft side, and then the balls pass through a second load region in which the load transmitted from the nut side to the steered shaft side is gradually increased, when the balls in the second predetermined range are moved from the other end side opening of the second connection passage along the nut side ball screw groove, wherein the first load transition region and the second load transition region are formed so that a length of a portion from an end portion of the first transition region on the first connection passage side through the ball circulation groove to an end portion of the second load transition region on the second connection passage side is non-integer multiple of a diameter of one of the balls.

11. The power steering device as claimed in claim 10, wherein the connection member includes a first insertion portion inserted into the first connection passage, a second insertion portion inserted into the second connection passage, and a connection portion connecting the first insertion portion and the second connection portion; and the first insertion portion and the second insertion portion are inclined along a lead angle of the nut side ball screw groove with respect to the connection portion.

12. The power steering device as claimed in claim 11, wherein the first connection passage and the second connection passage are formed so that the other end of the first connection passage and the other end of the second connection passage are apart from each other at substantially 180 degrees in a circumferential direction around the rotation axis of the nut.

13. The power steering device as claimed in claim 10, wherein the connection member is formed into a cylindrical shape; the first connection passage includes a first stepped portion on which one end surface of the connection member is abutted; the first stepped portion extends radially inside the connection member beyond an inner circumference surface of the connection member; the second connection passage includes a second stepped portion on which the other end surface of the connection member is abutted; and the second stepped portion extends radially inside the connection member beyond the inner circumference surface of the connection member.

14. The power steering device as claimed in claim 10, wherein the first load transition region and the second load transition region are formed, respectively, in ranges in which the plurality of the balls are simultaneously received.

15. The power steering device as claimed in claim 14, wherein the first load region and the second load region are formed, respectively, in ranges in which the plurality of the balls are simultaneously received.

16. The power steering device as claimed in claim 10, wherein the first load transition region and the second load transition region are formed to satisfy a following equation:

$$D \times (n+1/4) < L < D \times (n+3/4) \qquad \text{equation:}$$

where a length of a portion from the end portion of the first load transition region on the first connection passage side through the ball circulation groove to the end portion of the second load transition region on the second connection passage side is L, the diameter of the ball is D, and a number of the balls is n.

17. The power steering device as claimed in claim 10, wherein the first load transition region is formed so that a radial distance between the rotation axis of the nut and the nut side ball screw groove in the first load transition region is gradually varied in a movement direction of the ball, and the second load transition region is formed so that a radial distance between the rotation axis of the nut and the nut side ball screw groove in the second load transition region is gradually varied in a movement direction of the ball.

18. The power steering device as claimed in claim 10, wherein cross sectional shapes on a bottom side of the nut side ball screw groove are substantially identical in the first load transition region; and cross sectional shapes on the bottom side of the nut side ball screw groove are substantially identical in the second load transition region.

* * * * *